R. C. CAUGHEY.
POWER LIFT GANG PLOW.
APPLICATION FILED MAY 22, 1914.
1,296,266.
Patented Mar. 4, 1919.
3 SHEETS—SHEET 3.
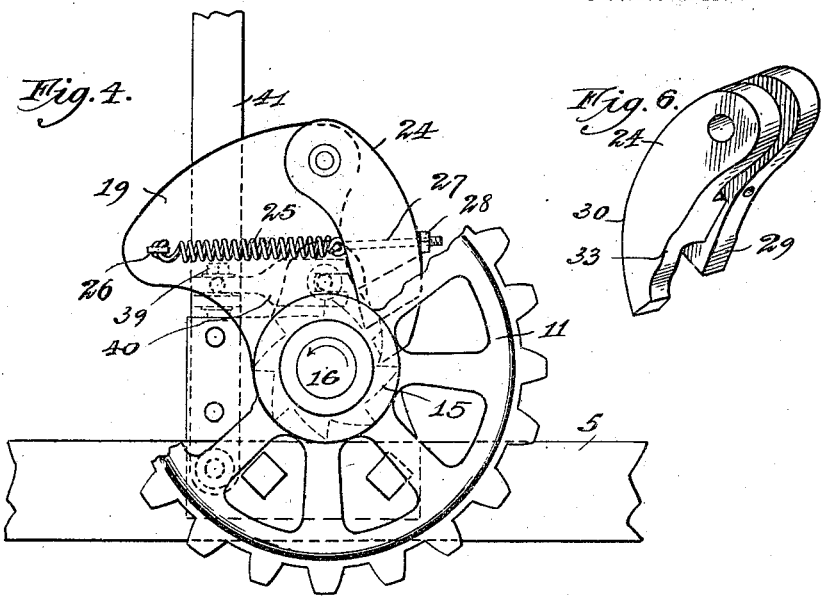
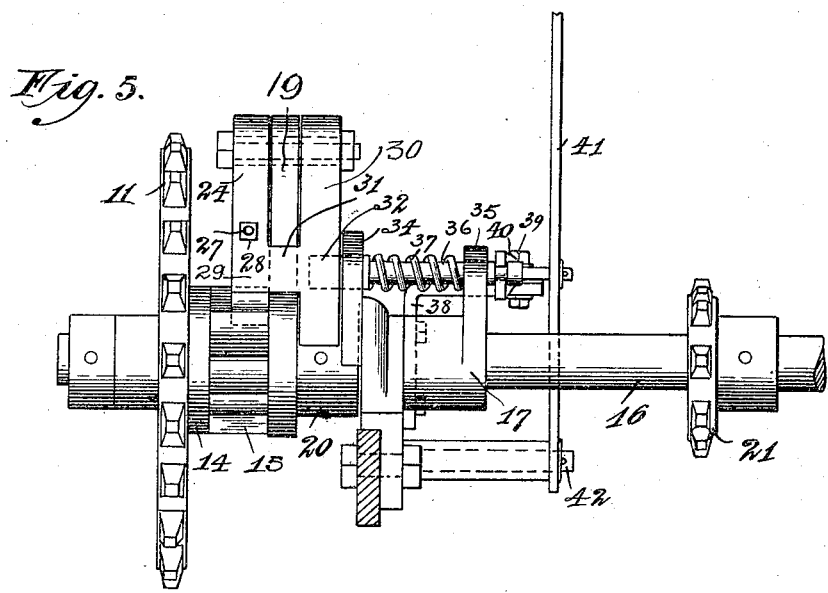
Witnesses,
F. S. Mann
C. A. Soans
Inventor;
Robert C. Caughey
By Offield Towle Graves & Offield
Attys

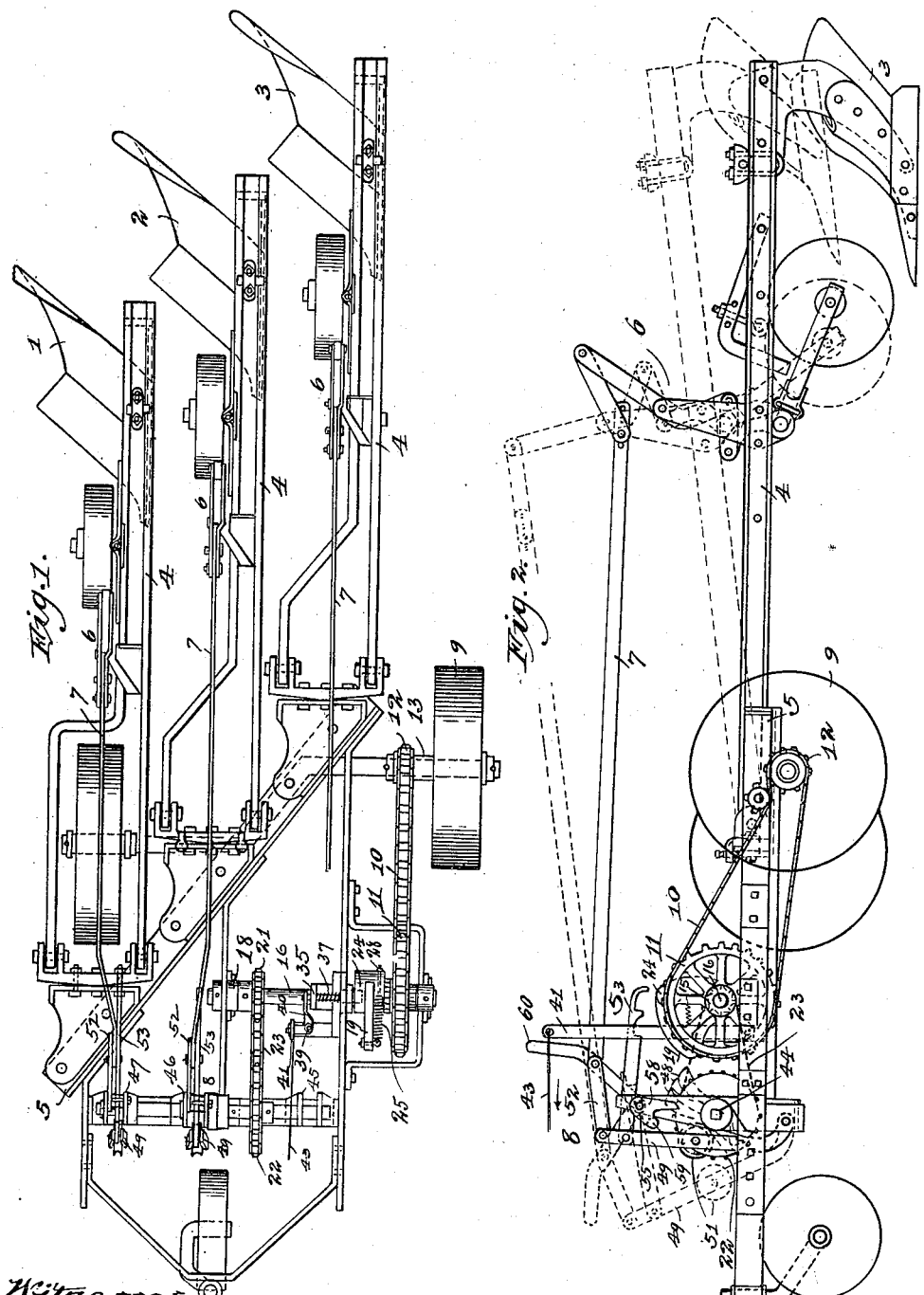

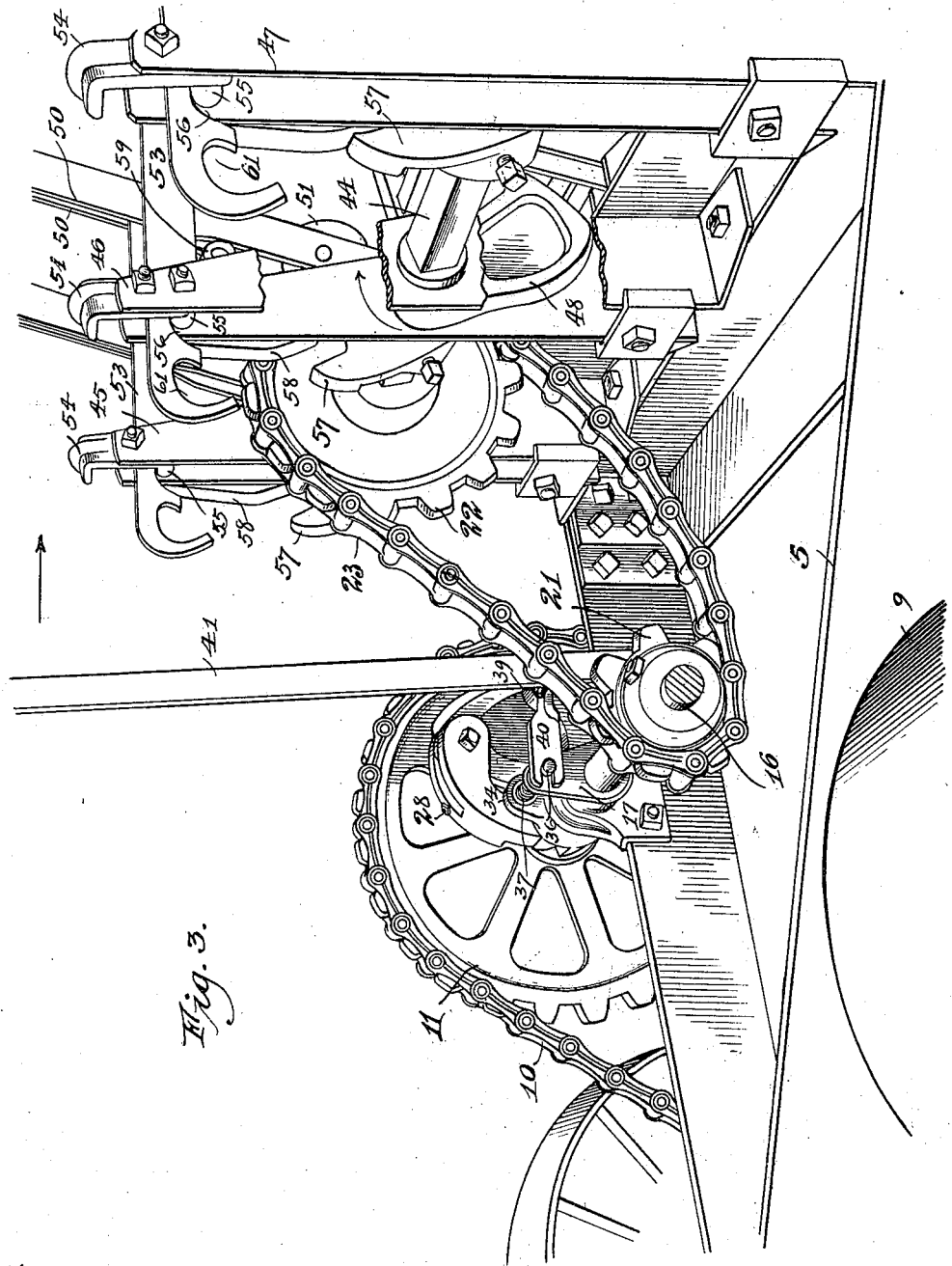

UNITED STATES PATENT OFFICE.

ROBERT C. CAUGHEY, OF DIXON, ILLINOIS, ASSIGNOR TO GRAND DETOUR PLOW COMPANY, OF DIXON, ILLINOIS, A CORPORATION OF ILLINOIS.

POWER-LIFT GANG-PLOW.

1,296,266.  Specification of Letters Patent.  Patented Mar. 4, 1919.

Application filed May 22, 1914. Serial No. 840,208.

*To all whom it may concern:*

Be it known that I, ROBERT C. CAUGHEY, a citizen of the United States, residing at Dixon, in the county of Lee and State of Illinois, have invented certain new and useful Improvements in Power-Lift Gang-Plows, of which the following is a specification.

My invention relates to improvements in power-lift gang plows and refers more particularly to the mechanism employed for elevating the plows from the ground when it is desired to render them inoperative, and for again lowering them into the ground when it is desired to resume plowing.

The clutch mechanism, which forms a part of the apparatus, is described and claimed in a divisional application Serial No. 878,044, filed by me December 19, 1914, said application having resulted in the issuance of U. S. Patent No. 1,146,135, dated July 13, 1915.

Among the salient objects of the invention are, to provide an improved mechanism for lifting the plows out of the ground or dropping them into the ground when desired; to provide an improved mechanism for positively driving the plow-lifting devices from one of the wheels of the plow; to provide an improved clutch mechanism for effecting operative engagement between the plow-lifting and dropping devices and the positively driven driving mechanism; to provide improved means for clutching and unclutching the power-lifting devices from the driving mechanism with a minimum of effort and manipulation or attention on the part of the operator, and in which the same manual movement is employed whether for elevating or dropping the plows; to provide an improved arrangement and construction of the power-lifting devices whereby the plows are elevated from the ground successively in their proper order and at the right point in their travel to leave the ends of the furrows of equal length; to provide an improved construction in the lifting mechanism whereby the plows are positively retained in elevated position without the possibility of becoming accidentally dropped, due to vibration or sudden movements of the gang plow; to provide an improved construction of latching mechanism for positively retaining the plows in elevated position and whereby the plows may be still further elevated manually and positively retained in said manually elevated position; to provide a construction having a comparatively small number of parts, and those of simple and rugged form and material; to provide a power-lift mechanism which shall be simple and economical in construction, and, in general, to provide an improved construction of the character referred to.

My invention consists in the matters hereinafter described and more particularly pointed out in connection with the accompanying drawings, in which—

Figure 1 is a plan view of my improved gang plow, certain parts being broken away to clarify the drawing;

Fig. 2 is a side elevation of Fig. 1 in which one of the plows is illustrated in both dropped and elevated positions;

Fig. 3 is a perspective view showing the clutch mechanism and the plow-lifting devices;

Fig. 4 is a fragmentary detail view showing a side elevation of the clutch mechanism;

Fig. 5 is a plan view of the clutch mechanism; and

Fig. 6 is a perspective view of the clutch pawl.

Referring to the drawings, the approved form of gang plow which I have illustrated in Fig. 1 is furnished with three plows 1, 2 and 3, each of them being mounted upon a longitudinal frame 4 horizontally pivoted to the oblique fixed main frame 5. Each of the plow units is raised or lowered by means of suitable link and lever mechanism designated as a whole 6 which may be of any suitable type, and is operated by the longitudinal link-rod 7 which extends from the link mechanism 6 to the front of the plow, where the latching mechanism designated as a whole 8 is located. The dotted lines in Fig. 2 show one of the plow units in elevated position and the full lines show the same unit in depressed or plowing position.

The lift mechanism is driven initially from one of the main wheels 9 of the gang plow by a chain 10 which connects the large sprocket wheel 11 of the lifting mechanism with the small sprocket wheel 12, the latter being securely keyed to a sleeve 13 forming an extension of the hub of the wheel 9. The large sprocket wheel 11 thus revolves continuously while the gang plow is being pulled over the ground. At one side of the sprocket wheel 11 and cast integrally with it is an extended hub portion 14 the end of which is formed with ratchet teeth 15, and the whole wheel with its hub is adapted to revolve freely upon the jack shaft 16 which is journaled in suitable bearings 17 and 18 fastened to the gang plow frame. Interposed between the hub 14 and the bracket 17 and securely pinned or keyed to the jack shaft 16 is a sector-shaped arm 19 provided with a suitable hub 20, and in a suitable position between the bearings 17 and 18 there is also keyed to the jack shaft 16 a small sprocket pinion 21 which drives the sprocket wheel 22 by a chain 23. The sprockets 21 and 22 have a 1 to 2 gear ratio for a purpose which will hereinafter appear.

The sector-arm 19 ordinarily occupies the position shown in the drawings and at its upper corner carries a pivoted pawl member 24 the upper end of which is forked to embrace said sector-arm. The lower end of the pawl member is urged toward the ratchet hub 14 by virtue of a coil tension spring 25 one end of which is secured to the sector-arm at 26 and the other end to a bolt 27 which passes through the pawl member 24 and is secured by a nut 28. The pawl member 24 consists of the pawl proper 29 and the cam 30 which are connected by an oblique four-sided web 31. The pawl 29 is adapted to engage the ratchet-teeth 15 when permitted to do so, but normally the pawl member 24 is lifted to bring the pawl 29 out of contact with the ratchet-teeth 15 by virtue of the pin 32 which engages the cam surface 33 on the under side of the cam 30 and thus lifts the point of the pawl out of the range of the ratchet-teeth. The pin 32 is constructed to slide in a pair of bracket arms 34 and 35 projecting from the top of the bearing 17, and the inner end of the pin is reduced in cross-section to form a stem 36 around which is wound a coil compression spring 37 which is interposed between the arm 35 and the shoulder on the pin and thus normally forces the latter longitudinally outward into the range of the cam 30. Secured to a part of the fixed frame of the gang plow is a small angular bracket 38 at the end of which is a vertical pivot 39 upon which is mounted a bell-crank lever 40. One end of the bell-crank lever 40 is forked and engages a groove in the projecting end of the stem 36, and the other end of the bell-crank is adapted to be engaged by the lever 41 which at its lower end is pivoted upon a pin 42 projecting horizontally from a fixed portion of the frame of the machine. The upper end of the lever 41 projects upward a considerable distance and is furnished with a cord 43 leading to the operator in the tractor used for pulling the gang plow.

Describing the operation of the clutch mechanism, it will be seen that with the parts in position shown, when the cord 43 is pulled the end of the lever 41 will move forward, the bell-crank lever 40 will rotate upon its pivot, the forked end of the bell-crank lever will thus pull the pin 32 longitudinally in its bearings, and, the end of the pin having been withdrawn from engagement with the cam 33, the pawl member 24 will be released and the pawl 29 will engage the ratchet-teeth 15 in the hub of the sprocket wheel. The ratchet-teeth in the hub are so formed as to engage the pawl 29 when the sprocket wheel 11 rotates in the direction of the arrow shown on the end of the shaft 16 in Fig. 4 which, as before described, is continually the case when the plow is being pulled ahead. The sprocket wheel is thus clutched to the sector-arm 19 which commences to rotate, and with it the shaft 16 and sprocket-pinion 21. As soon as the pawl member 24 has dropped into engagement with the ratchet-teeth on the hub and commences to rotate the shaft 16 the operator releases his pull on the cord and the pin 32 is thus urged back into its horizontal position by the spring 37, and just before the sector-arm 19 has completed a whole revolution the cam surface 33 strikes the end of the pin 32 and lifts the part 24 into its original position with the pawl 29 out of range of the ratchet-teeth 15. The rotary movement of the shaft 16, after its single revolution, is thus arrested.

Describing the actual mechanism used for lifting the plows out of the ground, by referring to Fig. 3 it will be seen that the sprocket wheel 22 is keyed to a square shaft 44 which projects horizontally across the gang plow and through three pairs of vertical brackets 45, 46 and 47. Securely keyed to the shaft 42 and adapted to rotate between each pair of brackets is a cam member 48, and directly in front of the brackets 45, 46 and 47 are three levers 49. These levers are pivoted beneath the vertical brackets 45, 46 and 47 and are formed from pairs of strap metal sides 50 between which are journaled cam rollers 51, the latter being positioned in the levers 49 at a suitable height to be engaged by the cam members 48 in their rotation around the shaft 44. The upper ends of the levers 49 are connected to the link-rod 7 by short pivoted links 52, and at points in the levers 49 slightly below the pivots of the links 52 are also pivoted latch-arms 53. The latch-arms 53 are rectangular bars adapted to slide longitudinally in small guides 54 carried by the upper ends of the brackets 45, 46 and 47 and rest upon circular spacing pins 55 between the upper ends of the said brackets 45, 46 and 47. The rear ends of the latch-bars 53 are formed with a pair of notches 56 which are adapted to engage the spacing pins 55 and prevent rearward movement of the latch-bars, thus maintaining the plows in elevated position.

For releasing and dropping the plows I employ a set of three release dogs 57 which are securely keyed to the square shaft 44 at one side of the brackets 45, 46 and 47 and are adapted in their rotation to engage the lower ends of the depending angular bell-crank levers 58 which are pivoted at their upper ends to the upper ends of the brackets 45, 46 and 47. The bell-crank levers 58 comprise integral castings formed with lower depending arms adapted to be engaged by the release cams and short angular arms at the ends of which are circular horizontally extending bosses 59 which extend below the latch-bars 53.

For the purpose of lifting the plows from the ground manually when the gang plow is stationary, I have provided a set of hand levers 60 which are pivoted at their lower ends to the tops of the brackets 45, 46 and 47 and are pivotally connected at points substantially in the middle of their length to the meeting connections of the links 52 and 7. It is obvious that the plows may be elevated from the ground by pulling forward upon the ends of the levers 60. In some cases when it is desired to haul the gang plow over rough country for a considerable distance without doing any actual plowing, the plows may be still further elevated from the ground by pulling forward the hand levers 60 until the pins 55 are engaged by a second set of notches 61 at the extreme end of the latch-bars 53, the release cams then being ineffective if accidentally operated, since the bosses 59 enter the notches 56.

The mechanical construction and operation is apparent from the above description. Whenever the cord 43 is pulled, the shaft 16 makes one revolution and one only, and this results in a corresponding half revolution of the square shaft 44. If the plows happen to be in the ground, the cams 48 are in their upper position and as the shaft 44 makes its half revolution in the direction of the arrow, the cams strike the rollers 51 and force back the levers 49, thus raising the plows which are retained in elevated position by the latch-bars 53 engaging the spacing pins 55. When it is desired again to drop the plows into the ground and commence plowing, the cord 43 is again pulled, the shaft 16 makes another single revolution and the square shaft 44 makes a corresponding half revolution. During this half revolution of the shaft 44 the release cams 57 strike the lower ends of the bell-crank levers 58 and the bosses 59 on the short angular arms of the bell-crank levers strike the under side of the latch-bars 53 and raise them a sufficient distance to disengage the notches 56 from the spacing pins 55. The plows are thus released from their elevated position and dropped into the ground.

It will be noticed from a close inspection of Figs. 2 and 3 that the release cams 57, although identical in form, are angularly displaced slightly with reference to each other around the shaft 44, and the cams 48 are similarly displaced with reference to each other. The purpose of this is to raise or release the plows in succession as the shaft 44 rotates so that all of the plows will be raised from or dropped into the ground at the same point in the length of the furrow so as to prevent leaving a furrow having an oblique finishing end, which would be the case if all of the plows were released and dropped simultaneously on account of the oblique arrangement of the plows. It will also be evident that the only manipulation required of the operator of the lift mechanism consists of a moderate pull upon the cord 43 to release the pin 32, the rest of the operation being automatic.

My invention is not limited to the details of construction shown and described except as specified in the appended claims.

I claim—

1. In a plow, power-lift mechanism comprising a continuously rotating member positively driven from one of the wheels of the plow, a normally idle rotary member normally disconnected from said rotating member, clutch mechanism carried by said normally idle member for operatively engaging the same with the rotating member, manually operated means for engaging said clutch, a cam shaft, gearing between said cam shaft and said normally idle member adapted to drive the cam shaft at one-half the speed of the normally idle member, lifting mechanism operated by said cam shaft and adapted to raise the plows from the ground during one-half of a revolution of said cam shaft, release mechanism operated by said cam shaft during the other half of the revolution of said cam shaft for permitting the descent of the plows by gravity into their operative positions, and automatic means for disengaging said clutch after the said normally idle member has effected a single revolution.

2. In a plow, the combination of positive driving means operated by the movement of the plow over the ground, a normally stationary shaft, means for operatively engaging said shaft with the driving means, means operated by said shaft for elevating a plow unit during a predetermined amount of rotation of said shaft, a latch for maintaining the plow unit in elevated position, and means operated by said shaft for releasing said latch during a further predetermined amount of rotary movement of said shaft.

3. In a power-lift engine gang plow, the combination of positive driving means, a normally stationary cam shaft, means carried by said shaft adapted to lift the plow units during a predetermined rotary movement of said cam shaft, latch mechanism for maintaining the plow units in elevated position, means operated by a further movement of said cam shaft for unlatching the plow units and clutch mechanism for connecting said shaft with said driving means.

4. In a plow, the combination of a plow unit adapted to be raised and dropped out of or into operative position, power-operated means for elevating said plow into inoperative position, means also operated by power for lowering said plow into its operative position, and manually operated means for further elevating said plow unit and beyond the influence of said power-operated lowering means.

5. In a power-lift plow, the combination of a main frame, an upwardly extending lever pivoted in the bottom of said frame, a power-operated shaft journaled in said frame above said pivot, said lever and shaft being provided with means adapted to effect pivotal movement of said lever upon rotation of said shaft, means for effecting definite rotary movements of said shaft, a plow-support pivoted to said frame, a connection extending from the upper end of said lever to said plow-support and adapted to elevate the same upon pivotal movement of said lever caused by the rotation of said shaft, a manually operable lever having one end pivoted at the upper part of said frame above said shaft and having an intermediate point in its length operatively connected to said connection, and latch mechanism for maintaining said plow-support in elevated position.

6. In a plow, the combination of a plow unit adapted to be raised and lowered out of or into operative position, automatic power-operated means for causing the raising or lowering of said plow unit at will, latch mechanism adapted to maintain said plow in position upon being elevated by said power-operated means, and manually-operated means for effecting a further elevation of said plow unit beyond the influence of said power-operated lifting and lowering means.

7. In a plow, the combination of a plow unit adapted to be raised and lowered out of or into operative position, latch mechanism for maintaining said plow unit in two different elevated positions, power-operated lifting and lowering mechanism for lowering the plow unit or raising it into one of said elevated positions, and manually-operated means for further elevating said plow unit into its second elevated position.

8. In a plow, the combination of a plow unit adapted to be raised and lowered out of or into operative position, power-driven elevating mechanism for said plow unit, latch mechanism for maintaining said plow unit in elevated position and in locked position, and elevating connections between said plow unit and said power-driven mechanism adapted to be operated by said power mechanism to latch said plow unit in elevated position and adapted to be manually-operated to extend said elevating movement of said plow unit into locked position.

9. In a power-lift plow, the combination of a main frame, an upwardly extending lever pivoted in the bottom of said frame, a power-operated shaft journaled in said frame above said pivot and behind said lever, said lever and shaft being provided with means adapted to effect a forward pivotal movement of said lever upon rotation of said shaft, means for effecting predetermined definite rotary movements of said shaft, a plow-support pivoted to the rear of said frame, a connection extending rearwardly from the upper end of said lever to said plow-support and adapted to elevate the same upon forward pivotal movement of said lever, a manually operable lever having one end pivoted at the upper part of said frame above said shaft and having an intermediate point in its length operatively connected to said connection, and latch mechanism for maintaining said plow-support in elevated position.

10. In a power-lift plow, the combination of a main frame, an upwardly extending lever pivoted in the lower part of said frame, a power-operated shaft journaled in said frame above said pivot and behind said lever, said lever and shaft being provided with coöperating means adapted to effect a forward pivotal movement of said lever upon rotation of said shaft, means for effecting predetermined definite rotary movements of said shaft, a plow-support pivoted to the rear of said frame, a link extending rearwardly from the upper end of said lever, a connection pivoted to the rear end of said link and extending rearwardly to said plow-support for elevating said plow-support upon the forward pivotal movement of said lever, a manually operable lever having its lower end pivoted in the upper part of said frame above said shaft and having an intermediate point in its length pivotally connected to the rear end of said link, and latch mechanism for maintaining said plow-support in elevated position.

11. In a power-lift plow, the combination of a main frame, an upwardly extending lever pivoted in the lower part of said frame, a power-operated shaft journaled in said frame above said pivot and behind said lever, said lever and shaft being provided with coöperating means adapted to effect a forward pivotal movement of said lever upon rotation of said shaft, means for effecting predetermined definite rotary movements of said shaft, a plow-support pivoted to the rear of said frame, a link extending rearwardly from the upper end of said lever, a connection pivoted to the rear end of said link and extending rearwardly to said plow-support for elevating said plow-support upon the forward pivotal movement of said lever, a manually operable lever having its lower end pivoted in the upper part of said frame above said shaft and having an intermediate point in its length pivotally connected to the rear end of said link, a latch member having its front end pivotally connected to said first lever and extending rearwardly over said shaft, and means carried by said frame for engaging said latch member to maintain said plow-support in elevated position.

12. In a power-lift plow, the combination of a main frame, an upwardly extending lever pivoted in the lower part of said frame, a power-operated shaft journaled in said frame above said pivot and behind said lever, said lever and shaft being provided with coöperating means adapted to effect a forward pivotal movement of said lever upon rotation of said shaft, means for effecting predetermined definite rotary movements of said shaft, a plow-support pivoted to the rear of said frame, a link extending rearwardly from the upper end of said lever, a connection pivoted to the rear end of said link and extending rearwardly to said plow-support for elevating said plow-support upon the forward pivotal movement of said lever, a manually operable lever having its lower end pivoted in the upper part of said frame above said shaft and having an intermediate point in its length pivotally connected to the rear end of said link, a latch member having its front end pivotally connected to said first lever and extending rearwardly over said shaft, means carried by said frame for engaging said latch member to maintain said plow-support in elevated position, and means operated by said shaft for disengaging said latch member.

13. In a power lift for plows, the combination with a plow, of a pivotally mounted shifter arm connected to the plow, an operating shaft, an arm fixed on said shaft and adapted, during a portion of its revolution, to move said shifter arm and raise the plow, a dog for checking the reverse movement of said shifter arm when said actuating arm ceases to move the same, to thereby hold the plow in raised position, and a part actuated by said shaft for releasing said dog.

14. In a power lift plow, the combination of a plow, a lifting connection for said plow, a latch coöperating with said lifting connection for maintaining the plow in raised position, a trip member movably mounted with reference to said latch and adapted to move and release the latter to drop the plow, a normally stationary shaft, a member keyed to said shaft for directly engaging and actuating said lifting connection upon a rotary movement of said shaft, and a member driven by said shaft for actuating said trip member upon a further rotary movement of said shaft.

15. In a power lift plow, the combination of a main frame, a plow mounted thereon and capable of vertical movement relative thereto, a shifter arm pivotally mounted on said frame and connected to the plow, a normally stationary cam shaft journaled in said frame, a member keyed to said shaft and adapted upon a rotary movement of said shaft to engage and move said shifter arm to raise the plow, a latch for maintaining the plow in raised position, a pivoted trip member for moving said latch to release the latter to drop the plow, means operable by a further rotary movement of said shaft to actuate said trip member, continuous driving means for rotating said shaft, and clutch mechanism for effecting mechanically predetermined successive rotary movements of said shaft.

16. In a power lift plow, the combination of a main frame, a plow movably mounted thereon, a lifting connection for said plow, a latch member movably mounted with reference to said lifting connection and adapted to maintain the plow in raised position, a trip member mounted to move independently of and engage said latch for releasing the latter to drop the plow, a normally stationary shaft, continuous driving means, clutch mechanism for effecting mechanically predetermined successive rotary movements of said shaft, and means operable by successive rotary movements of said shaft for alternately lifting the plow and actuating said trip member.

17. In a power lift plow, the combination of a main frame, a plow movably mounted thereon, a lifting connection for said plow, a latch member movably mounted with reference to said lifting connection and adapted to engage the same to maintain the plow in raised position, a trip member mounted to move independently of and engage said latch for releasing the latter to drop the plow, a normally stationary shaft, continuous driving means, clutch mechanism for effecting mechanically predetermined successive limited rotary movements of said shaft, a member keyed to said shaft for directly engaging and actuating said lifting connection, and a second member keyed to said shaft for engaging and actuating said trip member.

ROBERT C. CAUGHEY.

Witnesses:
 GERTRUDE CASTLES,
 A. W. LELAND.